United States Patent
Schneider (10) Patent No.: US 9,694,991 B2
(45) Date of Patent: Jul. 4, 2017

(54) SYSTEM FOR TREATING AND CONVEYING OBJECTS

(75) Inventor: Gerd Schneider, Gaertringen (DE)

(73) Assignee: EISENMANN AG, Boeblingen (DE)

( * ) Notice: Subject to any disclaimer, the term of this patent is extended or adjusted under 35 U.S.C. 154(b) by 1042 days.

(21) Appl. No.: 13/505,032

(22) PCT Filed: Aug. 26, 2010

(86) PCT No.: PCT/EP2010/005236
§ 371 (c)(1),
(2), (4) Date: Apr. 30, 2012

(87) PCT Pub. No.: WO2011/050876
PCT Pub. Date: May 5, 2011

(65) Prior Publication Data
US 2012/0216746 A1    Aug. 30, 2012

(30) Foreign Application Priority Data
Oct. 29, 2009 (DE) .......................... 10 2009 051 316

(51) Int. Cl.
*B05C 13/02* (2006.01)
*B65G 49/04* (2006.01)
*B05C 3/10* (2006.01)

(52) U.S. Cl.
CPC ............ *B65G 49/0459* (2013.01); *B05C 3/10* (2013.01)

(58) Field of Classification Search
None
See application file for complete search history.

(56) References Cited

U.S. PATENT DOCUMENTS 3,259,351 A * 7/1966 Olsen ................... B25H 1/0028
                                                            248/325
4,961,316 A * 10/1990 Corke et al. ................... 60/431
(Continued)

FOREIGN PATENT DOCUMENTS

DE        201 05 676 U      6/2001
DE        100 54 366 A1     5/2002
(Continued)

OTHER PUBLICATIONS

English translation of DE10054366.*
English translation of DE10241026.*

*Primary Examiner* — Charles Capozzi
(74) *Attorney, Agent, or Firm* — Factor Intellectual Property Law Group, Ltd.

(57) ABSTRACT

A system for treating objects transported by at least one transport carriage and immersed into at least one treatment container, in which a treatment medium can be applied. The transport carriage comprises at least one swivel arm connected to the chassis in an articulated manner, on which swivel arm the object can be fastened. A hydraulically operating piston-cylinder unit having a first working chamber to drive the swivel arm and provide weight balancing. The first working chamber is made smaller during the downward motion of the swivel arm and is connected to a first pressure accumulator. The second working chamber of the piston-cylinder unit, made larger during the downward motion of the swivel arm, is connected to a source for pressurized hydraulic fluid and can be drained during the downward motion of the swivel arm. The pressure of the fluid in the accumulator swivels the swivel arm and object upward if the pressure in the second working chamber is sufficiently low.

10 Claims, 5 Drawing Sheets

(56) References Cited

U.S. PATENT DOCUMENTS

| | | | |
|---|---|---|---|
| 5,984,081 A * | 11/1999 | Miyazawa | 198/509 |
| 6,457,369 B1 * | 10/2002 | Petersen | 73/798 |
| 6,676,755 B2 | 1/2004 | Ehrenleitner et al. | |
| 7,134,541 B2 * | 11/2006 | Matsubara | B65G 49/0459 |
| | | | 198/378 |
| 7,644,679 B2 | 1/2010 | Ehrenleitner | |
| 2003/0056723 A1 | 3/2003 | Ehrenleitner et al. | |
| 2003/0226354 A1 * | 12/2003 | Nippert | F15B 1/033 |
| | | | 60/454 |
| 2005/0139158 A1 * | 6/2005 | Matsubara | B65G 49/0459 |
| | | | 118/400 |
| 2008/0097673 A1 * | 4/2008 | Tomita | E02F 3/404 |
| | | | 701/50 |
| 2008/0247847 A1 | 10/2008 | Muller et al. | |

FOREIGN PATENT DOCUMENTS

| | | |
|---|---|---|
| DE | 102 10 941 A1 | 10/2003 |
| DE | 102 41 026 A1 | 3/2004 |
| WO | 2005115886 A1 | 12/2005 |

\* cited by examiner

SYSTEM FOR TREATING AND CONVEYING OBJECTS

RELATED APPLICATIONS

This application claims the filing benefit of International Patent Application No. PCT/EP2010/005236, filed Aug. 26, 2010, which claims the filing benefit of German Patent Application No. 10 2009 051 316.7 filed Oct. 29, 2009, the contents of both of which are incorporated herein by reference.

TECHNICAL FIELD AND BACKGROUND OF THE INVENTION

The invention relates to a system for the treatment, in particular the cataphoretic dip coating, of objects, in particular vehicle bodies, having
   a) at least one treatment container, in which a treatment medium can be applied to the objects;
   b) at least one transport carriage, which guides at least one object in a translatory movement through the system, thereby introducing this object into, and removing it from, the treatment container, and which in turn comprises:
   ba) a moveable chassis;
   bb) at least one swivel arm connected to the chassis in an articulated manner;
   bc) a holding means for the object, which is fixed to the swivel arm;
   bd) a drive device for the translatory movement of the chassis;
   be) a drive device for the swivel movement of the swivel arm;
   bf) a weight balancing device by means of which the force required to swivel the swivel arm is reduced and which comprises an energy accumulator in which the energy associated with the lowering of the object can be buffered and from which the buffered energy can be retrieved again during the upward movement of the object.

SUMMARY OF THE INVENTION

In coating systems for vehicle bodies, but also for other objects, there are a plurality of treatment containers in which a treatment fluid or another, also gaseous, treatment medium is applied to the objects. The term "applied" is used here to refer both to soaking and spraying the objects with the treatment medium and also to dipping them into the treatment medium. "Soaking" is a procedure in which relatively large quantities of treatment medium are applied to the objects per unit time. Such soaking is used for example for primary cleaning of vehicle bodies in the so-called pre-treatment zone. The term spraying refers to the generation of a very fine spray mist which penetrates into all the recesses, scratches and other inaccessible points of the treated objects. Such spray procedures are carried out for example both for cleaning and also for phosphate coating, passivation or activation of surfaces and for rinsing off a treatment fluid. During the dipping procedure, the objects—as the name implies—are brought under the surface of a bath of the treatment medium, generally a treatment fluid. Dipping procedures likewise take place for example during cleaning and in other processes which take place in the pre-treatment zone, but also in the coating procedure itself.

A particularly significant feature of such systems is the manner in which the objects are guided through the system and introduced into, and removed from, the individual treatment containers. The kinematics of these objects as used here should firstly ensure that the objects can be optimally targeted by the treatment medium, but that they can also be completely removed from the treatment medium again. Secondly, the kinematics of the objects should be such that the length of the individual treatment containers and therefore also the length of the system as a whole remains as short as possible.

A further requirement is that the forces required for introducing and removing the object into and from the treatment container, and therefore the energy expenditure, are kept as small as possible. The system described in DE-U-201 05 676 has essentially proven effective in this regard. The degrees of freedom of movement provided by the transport carriage used for the objects in this system fulfils the above-mentioned requirements optimally. To keep the force required for swiveling the objects as low as possible, the known system uses counter-weights. However, counter-weights of this type cannot prevent the energy associated with the lowering of the objects from dwindling and having to be summoned up again when the objects are raised. When different objects with a different weight are to be treated in the system, it is in any case difficult or even impossible to adapt the counter-weight optimally.

For this reason, the system known from DE 102 10 941 B4 used a different weight balancing device, namely an energy accumulator in which the energy released when the object is lowered can be buffered and from which the buffered energy can be retrieved again to support the upward movement of the object. This document is concretely referring here to a gas-filled, particularly air-filled, bellows device wherein the spring characteristic of the bellows device can be adapted individually to the weight of the particular object carried by the transport carriage. The swivel movement of the swivel arm is effected by an electric geared motor.

This known system fulfils the above-mentioned requirements very effectively, but involves a certain degree of expenditure on apparatus.

An object of the present invention is to design a system of the type mentioned at the outset in such a way that it is altogether more economical and less susceptible to faults.

This object may be achieved according to the invention in that,
   c) the drive device for the swivel arm and the weight balancing device are formed together by at least one hydraulically operating piston-cylinder unit which has a first working chamber which diminishes during the downward movement of the swivel arm and is connected in a closed system to a first pressure accumulator, and a second working chamber which increases during the downward movement of the swivel arm and is connected to a source of pressurised hydraulic fluid and can be emptied into a fluid tank during the upward movement of the swivel arm;
   wherein
   d) the pressure of the hydraulic fluid in the first pressure accumulator is sufficient to swivel the swivel arm together with the object upwards when the pressure in the second working chamber of the piston-cylinder unit has dropped below a particular value.

According to the invention, it was recognised that a hydraulically operating piston-cylinder unit can serve both as a drive device for the swivel movement of the swivel arm and as a weight balancing device. Owing to this double function of the piston-cylinder unit, the expenditure on apparatus associated with bringing about the swivel movement of the swivel arm can be lowered considerably by comparison with the prior art and the susceptibility to faults can be reduced. As a result of the fact that the first working chamber is connected in a closed system to a pressure accumulator, the hydraulic fluid is moved back and forth between the first working chamber of the piston-cylinder unit and the first pressure accumulator without the use of a hydraulic pump, as brought about by the swivel movement of the swivel arm. If the first working chamber of the piston-cylinder unit is emptied and, with this, the first pressure accumulator is filled, energy is buffered therein which can then be retrieved during the reverse movement of the hydraulic fluid from the first pressure accumulator into the first working chamber of the piston-cylinder unit. Whether an upward or a downward movement of the swivel arm takes place is dependent on the pressure ratios in the second working chamber of the piston-cylinder unit, which can be optionally more or less depressurised via a connection to the fluid tank for movement against the pressure in the first working chamber with the source of liquid hydraulic fluid or for a movement in the opposite direction.

The invention moreover ensures that, in any event, and also in the event of a system failure or power outage, the swivel arm with the object can be lifted upwards out of the treatment medium. This is a useful safety feature.

The source of pressurised hydraulic fluid can comprise a hydraulic pump and a second pressure accumulator. The second pressure accumulator, which is filled at suitable times, supports the action of the hydraulic pump here.

Each pressure accumulator preferably comprises a diaphragm which divides its interior into a first working chamber filled with hydraulic fluid and a second working chamber filled with gas. During the back and forth movement of the hydraulic fluid between the first working chamber of the piston-cylinder unit and the first pressure accumulator, the gas in the first pressure accumulator is therefore compressed or expanded to store or release the energy respectively.

A proportional valve which can be used to adjust the speed of the swivel movement of the swivel arm can be located in the flow path between the second working chamber of the piston-cylinder unit and the pressure source or in the flow path between the first working chamber of the piston-cylinder unit and the first pressure accumulator. It is optionally possible to use different throttle valves here for the upward and downward movement of the swivel arm.

The hydraulic fluid must be compatible with the treatment medium. With regard to the motor industry, for which paints in particular are used as a treatment medium, a water/glycol mixture with a water content of more than 35 percent by weight is particularly suitable. If small quantities of this hydraulic fluid enter the treatment medium through leaks in the hydraulic system, then this is not harmful.

For some hydraulic fluids which are of interest in this regard, effectively operating proportional valves are not available. In these cases, it is recommended that the hydraulic pump is a frequency-controlled two quadrant pump. The movement speed of the swivel arm is adjusted here via the frequency.

When using a frequency-controlled two quadrant pump of this type, the hydraulic fluid can, in particular, also be pure water. Since very many treatment fluids, particularly also paints, contain water as a solvent in any case, a leak in the hydraulic system does not pose a problem if a little water escapes through this into the treatment medium.

It goes without saying that the closed hydraulic system, which comprises the first working chamber of the piston-cylinder unit and the first pressure accumulator, can lose pressure over time due to leaks. In this case, it should be possible to connect the first pressure accumulator temporarily to a hydraulic pump to re-establish the original pressure.

The periods in which the swivel arm is swiveled during the passage of the transport carriage through the transport system are normally relatively brief. The capacity of the hydraulic pump can then be kept small in that the second pressure accumulator can be connected to the hydraulic pump during the idle times of the piston-cylinder unit. In these idle times, the hydraulic pump restores the pressure in the second pressure accumulator, which is then available at a later point in time to support the hydraulic pump.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is explained in more detail below with reference to the drawing, which shows.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
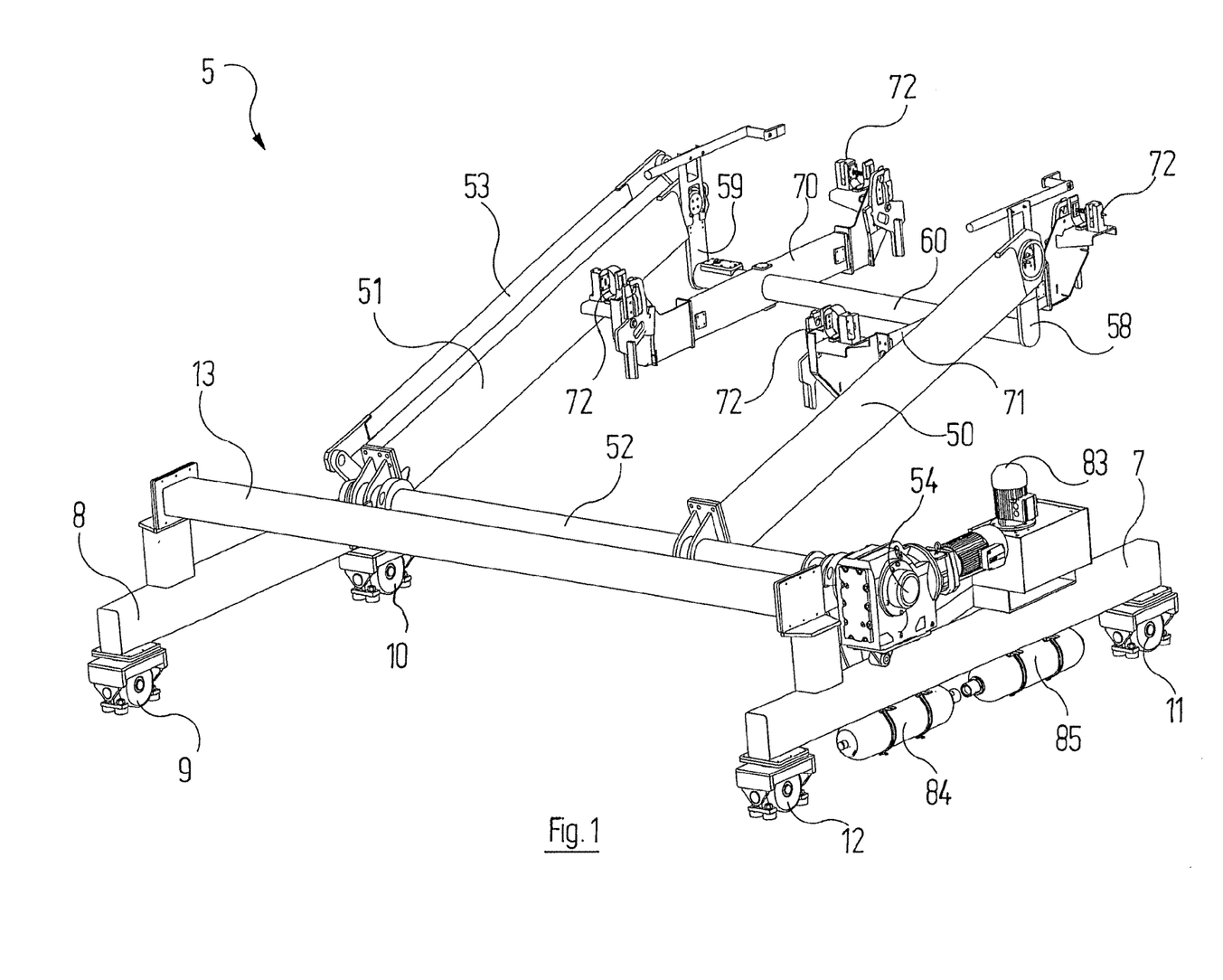
FIG. 1 a perspective view of the components of a transport carriage which are necessary for an understanding of the present invention.
Figure 2:
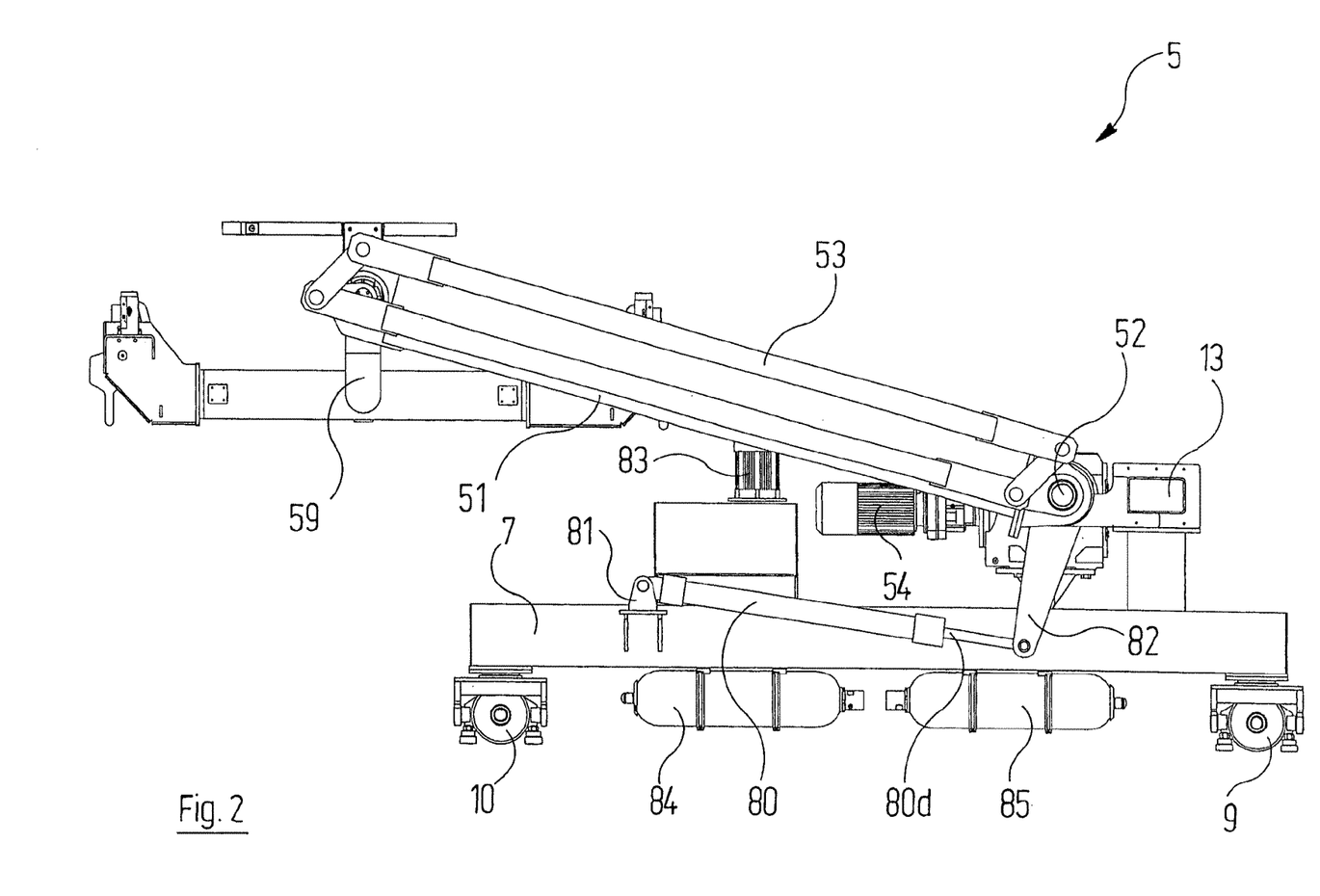
FIG. 2 the side view of the transport carriage from FIG. 1.
Figure 3:
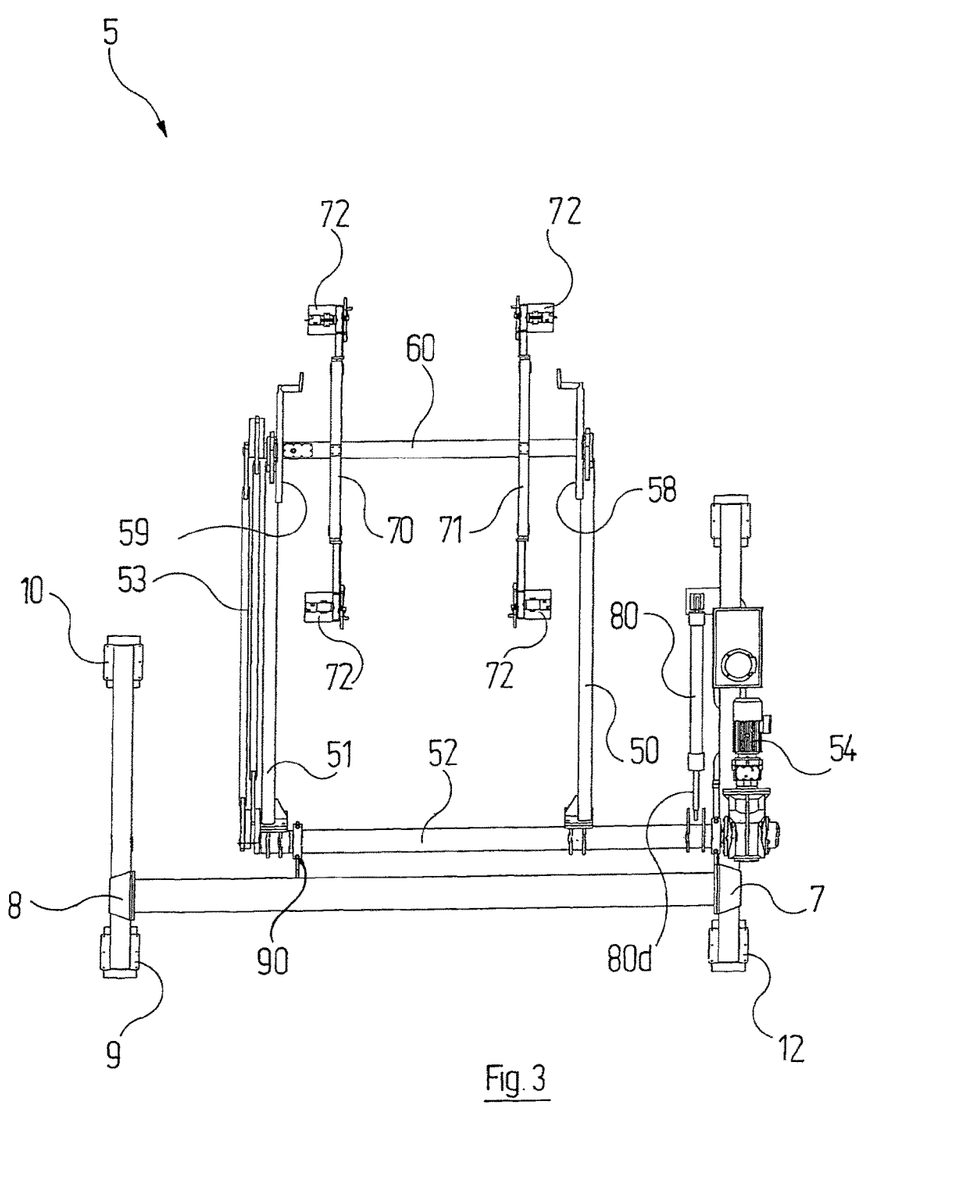
FIG. 3 the plan view of the transport carriage from FIG. 1.

Reference is firstly made to FIGS. 1 to 3. The transport carriage, which is denoted therein as a whole by the reference numeral 5, is known in terms of its essential functions and its essential construction from DE-U-201 05 676. So as not to go overboard on the figures and the associated description, various components of the transport carriage 5 are omitted in the drawing. For supplementary details relating to these components, please refer to DE-U-201 05 676.

The transport carriage 5 has a chassis in the form of two longitudinal crossbars 7, 8 on the underside of which two wheels 9, 10 and 11, 12 are mounted in each case such that they are rotatable about a horizontal axis. The wheels 9 to 12 are each additionally capable of twisting about a vertical axis with the aid of a respective swivelling bolster (not illustrated) so that the alignment of the wheels 9 to 12 relative to the respective longitudinal crossbars 7, 8 can be altered.

The wheels 9, 10 roll along a first running surface (not illustrated) and the wheels 11, 12 roll along a second running surface (likewise not illustrated) which is parallel to the first running surface thereby providing translatory movement of the movable chassis. The running surfaces are in turn mounted in each case on a beam which is supported by a steel structure (not illustrated).

The wheels 9 to 12 are suitably guided such that they follow the course of the running surfaces 13, 14, as shown in detail in the above mentioned DE-U-201 05 676.

The two longitudinal crossbars 7, 8 are mutually connected by a transverse crossbar 13. A shaft 52, which is parallel to the transverse crossbar 13 and extends perpendicularly to the longitudinal crossbars 7, 8 and therefore perpendicularly to the movement direction of the transport carriage 5, is mounted with one end on the longitudinal crossbar 7 and with the other on a bearing holder 90 supported by the transverse crossbar 7. Two parallel swivel arms 50, 51 are mounted with rotational fit on the shaft 52 and a bracket 58, 59 is swivel-mounted in each case on the ends of the swivel arms which are remote from the shaft 52. With the aid of a geared motor 54, which is fixed to the longitudinal crossbar 7 approximately in its central region, the left bracket 59 (as shown in FIG. 1) can be swiveled by way of a quill shaft extending in the hollow shaft 52 and by way of the schematically illustrated linkage 53 which extends parallel to the swivel arm 51. However, the precise manner in which the swivel movement of the bracket 59 is generated is irrelevant in this regard.

The ends of the brackets 58, 59 which are remote from the swivel arms 50, 51 are mutually connected by a transverse crossbar 60 which extends perpendicularly to the movement direction of the transport carriage 5 and is in turn rigidly connected to the central region of two supporting struts 70, 71 which are parallel to one another and to the movement direction. Fastening devices 72 are mounted at the opposite ends of each supporting strut 70, 71 and can be used to fix a vehicle body to be treated (not illustrated) to the supporting struts 70.

A hydraulic piston-cylinder unit 80, which is shown particularly clearly in FIG. 2, serves as a drive for the swivel movement of the two swivel arms 50, 51 about the shaft 52. The piston-cylinder unit 80 is swivel-connected by one end to a bracket 81 which is in turn fixedly mounted on the longitudinal crossbar 7. The free end of the piston rod 80d which forms the other end of the piston-cylinder unit 80 is swivel-connected to a bracket 82 which is in turn connected with rotational fit to the shaft 52. It is clear that a retraction and extension of the piston rod 80d of the piston-cylinder unit 80 can thus enable the two swivel arms 50, 51 to swivel about the shaft 52. As described in DE-U-201 05 676, this swivel movement can be used to dip the vehicle body fixed to the supporting struts 70, 71 into a treatment bath or the like and remove it therefrom.

The hydraulic pressure required for the piston-cylinder unit 80 is generated by an electric hydraulic pump 83.

The hydraulic drive system of the transport carriage 5 moreover includes two pressure accumulators 84, 85 which are arranged on the underside of the longitudinal crossbar 7.

The mode of operation of the hydraulic drive for the swivel movement of the swivel arms 50, 51 is now explained with reference to the hydraulic diagram shown in FIG. 4. In this Figure, the piston-cylinder unit 80 with the piston rod 80d, the two pressure accumulators 84, 85 and the hydraulic pump 83 are again shown schematically.

One of the two working chambers 80a, 80b of the piston-cylinder unit 80 which are separated from one another by the piston 80c thereof, namely the working chamber 80a, is connected to the pressure accumulator 84 by way of a line 86 and a 2/4-way solenoid valve 91 and a 2/2-way solenoid valve 87. The 2/2-way valve 87 is normally held in the open position shown by a current and is only brought into the closed position for the purposes described below and in the event of a power outage.

The mode of operation of the 2/4-way valve 91 is described in more detail below. In the meantime, it is sufficient to know that, through its conductive "circuit" as illustrated in FIG. 4, it fulfils the functional role of a 2/2-way valve which interrupts the line 86 in one position and forms a controllable throttle valve in the line 86 in the other position. The design as a 2/4-way valve 91 is merely aimed at increasing the capacity.

The second working chamber 80b of the piston-cylinder unit 80 is in communication with a 2/3-way solenoid valve 89 by way of a line 88.

The second pressure accumulator 85 is connected to a port of the 2/3-way valve 89 by way of a further 2/2-way valve 93 which is operated in the manner described above and is located in a line 94. A further connection to the line 86 and therefore indirectly to the first pressure accumulator 84 is produced by way of a line 95 and a further 2/2-way solenoid valve 96.

The hydraulic pump 83 draws hydraulic fluid from a fluid tank 97 by way of a line 98 and conducts this to a second port of the 2/3-way valve 89 by way of a filter 99, to which a pressure-operated switch 100 monitoring the degree of contamination of the filter 99 is connected in parallel, and by way of a non-return valve 101 and a line section 102. The hydraulic fluid can be conducted directly back into the fluid tank 97 again by way of a further line 103, in which there is a further 2/2-way solenoid valve 104, which is normally closed. A pressure limiting valve 106 is connected in parallel to the 2/2-way valve 104.

The third port of the 2/3-way valve 89 is likewise connected to the fluid tank 97 by way of a further line 105.

The two pressure accumulators 84, 85 are constructed in the same manner. They each have a diaphragm 106 and 107 through which the interior of the respective pressure accumulator 84, 85 is divided into a working chamber 84a and 85a, which is filled with hydraulic fluid and is connected to the corresponding 2/2-way valve 87 and 93, and a second, inherently closed working chamber 84b and 85b which is filled with pressurised gas. The pressure of the gas located in the first pressure accumulator 84 when the connection to the working chamber 80a of the piston-cylinder unit 80 is open is sufficient to press the piston 80c in FIG. 4 to the right and therefore to press the swivel arms 50, 51 into their upper position when the pressure in the other working chamber 80b is sufficiently low, particularly also zero. In other words: the pressure of the gas in the working chamber 84b of the pressure accumulator 84 always ensures that the supporting struts 70, 71 and the vehicle body fixed thereto are in their uppermost position, i.e. outside the treatment bath, when the pressure in the opposing working chamber 80b of the piston-cylinder unit 80 is not greater. This is an important safety feature in case hydraulic pressure cannot be generated with the aid of the hydraulic pump 83, for example if the electric current fails or another failure occurs in the hydraulic or electrical components.

Figure 4:
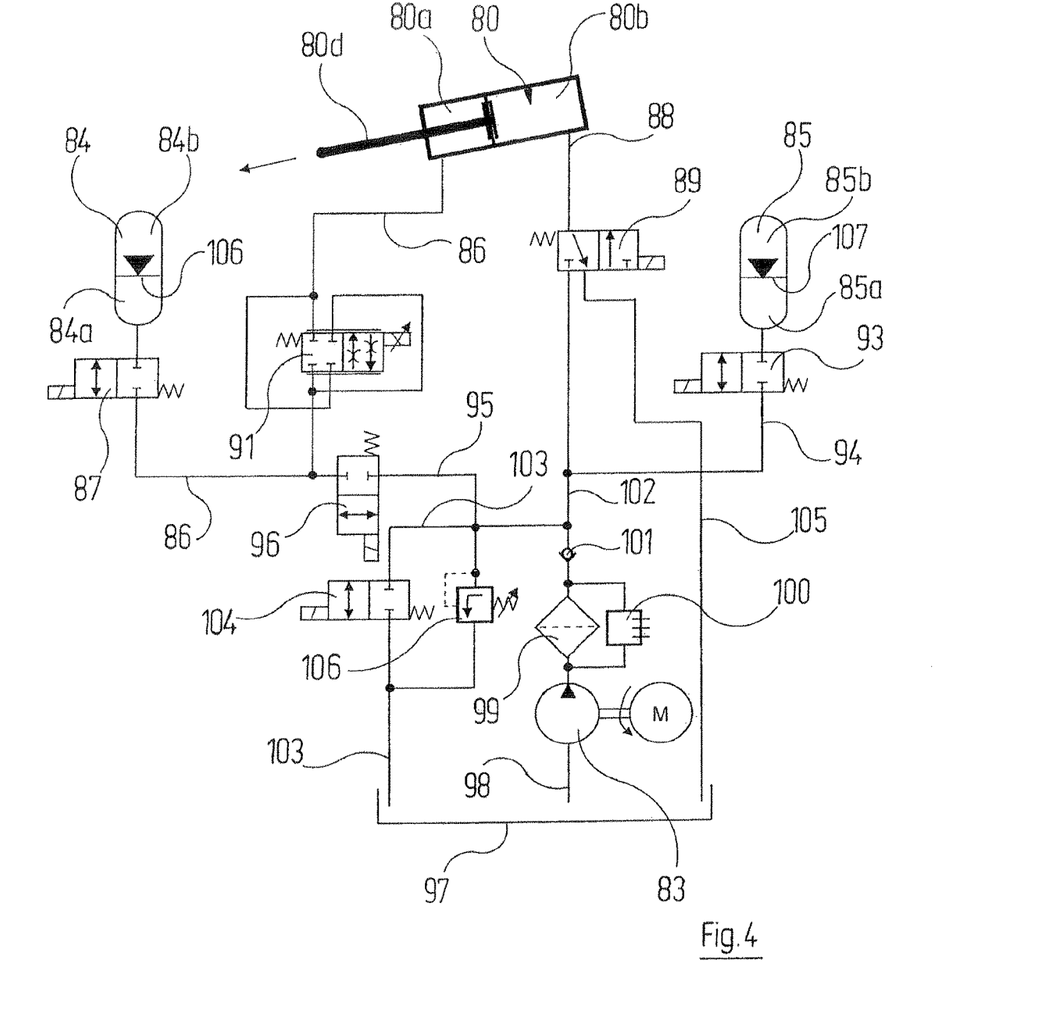
FIG. 4 a diagram of the hydraulics used for the transport carriage of FIG. 1.

A situation is assumed below in which the pressure accumulator 84, as shown in FIG. 4, is connected to the working chamber 80a of the piston-cylinder unit 80 by way of the open 2/2-way valve 87 and the 2/4-way valve 91 located in the throttling position and the vehicle body is raised. The 2/3-way valve 89 is located in the position illustrated in FIG. 4, in which the second working chamber 80b of the piston-cylinder unit 80 is connected to the fluid tank 07 by way of the line 105. It goes without saying that the 2/2-way valve 96 has to be closed here. The closed position of this 2/2-way valve 96 is moreover the normal position. It is only opened as an exception when the hydraulic pressure in the working chamber 84a of the first pressure accumulator 84 has dropped over time due to leaks and has to be raised again with the aid of the hydraulic pump 83.

The second pressure accumulator 85 is substantially continuously pressurised in its working chamber 85a with the aid of the hydraulic pump 83 by way of the filter 99, the non-return valve 101, the line 94 and the 2/2-way valve 93. It goes without saying that, unlike in the drawing, the 2/2-way valve 93 has to be in its open position for this. Since this can take place over relatively long periods of time, even during the idle times of the system in which the swivel arms 50, 51 are not swiveled, the capacity of the hydraulic pump 83 can be kept relatively small.

It shall now be assumed that the swivel arms 50, 51 of the transport carriage 50 are to be swiveled downwards, whereby the vehicle body is dipped into the treatment fluid. To this end, both a connection between the working chamber 85a of the second pressure accumulator 85 and the working chamber 80b of the piston-cylinder unit 80 and also a connection between this working chamber 80b and—by way of the non-return valve 101 and the filter 99—the hydraulic pump 83 is produced with the aid of the 2/3-way valve 89 when the 2/2-way valve 93 is open. As soon as the pressure in the working chamber 80b of the piston-cylinder unit 80 thereby exceeds the pressure in the working chamber 80a, the piston 80c is displaced to the left in FIG. 4. This results in the swivel arms 50, 51 being swiveled downwards in the desired manner. The speed of this swivel movement is determined by the throttling provided by the 2/4-way valve 91.

As soon as the vehicle body has been dipped sufficiently deeply into the treatment bath, the downward swivel movement of the swivel arms 50, 51 is interrupted in that the 2/4-way valve 91 is brought into the closed position.

If the swivel arms 50, 51 are to be swiveled upwards again, causing the vehicle body to be lifted upwards out of the treatment bath, the 2/4-way valve 91 is brought into the throttling position and the 2/3-way valve 89 is adjusted so that the hydraulic fluid located in the working chamber 80b of the piston-cylinder unit 80 can flow off into the fluid tank 97 by way of the line 88 and the line 105. The speed of this lifting movement is in turn determined by the respective throttling taking place in the 2/4-way valve 91. The 2/2-way valve 93 is closed during this upward swivel movement of the swivel arms 50, 51, which corresponds to a movement of the piston 80c to the right in FIG. 4 and can be attributed exclusively to the gas pressure in the working chamber 84b of the first pressure accumulator 84.

If required, the hydraulic fluid located in the fluid tank 97 can, during stoppages of the transport carriage 5, be conducted with the aid of the hydraulic pump 83 in a circuit via the filter 99, the non-return valve 101, the open 2/2-way valve 104 and the line 103 and can thereby be cleaned in the filter 99. Should impurities cause the drop in pressure in the filter 99 to become too great, the pressure-operated switch 100 responds and triggers an alarm signal.

The hydraulic diagram described above with reference to FIG. 4 is suitable if a water/glycol mixture (HFC) is used as the hydraulic fluid. The water content here should be greater than 35%. A hydraulic fluid of this type not only has a low flammability and a wide operating temperature range between minus 20° C. and plus 60° C., but it is also compatible with the coating materials, particularly paints, conventionally used in the motor industry for coating vehicle bodies. Therefore, should leaks appear in the hydraulic system and small quantities of the hydraulic fluid enter the treatment bath, then this would not be harmful.

Figure 5:
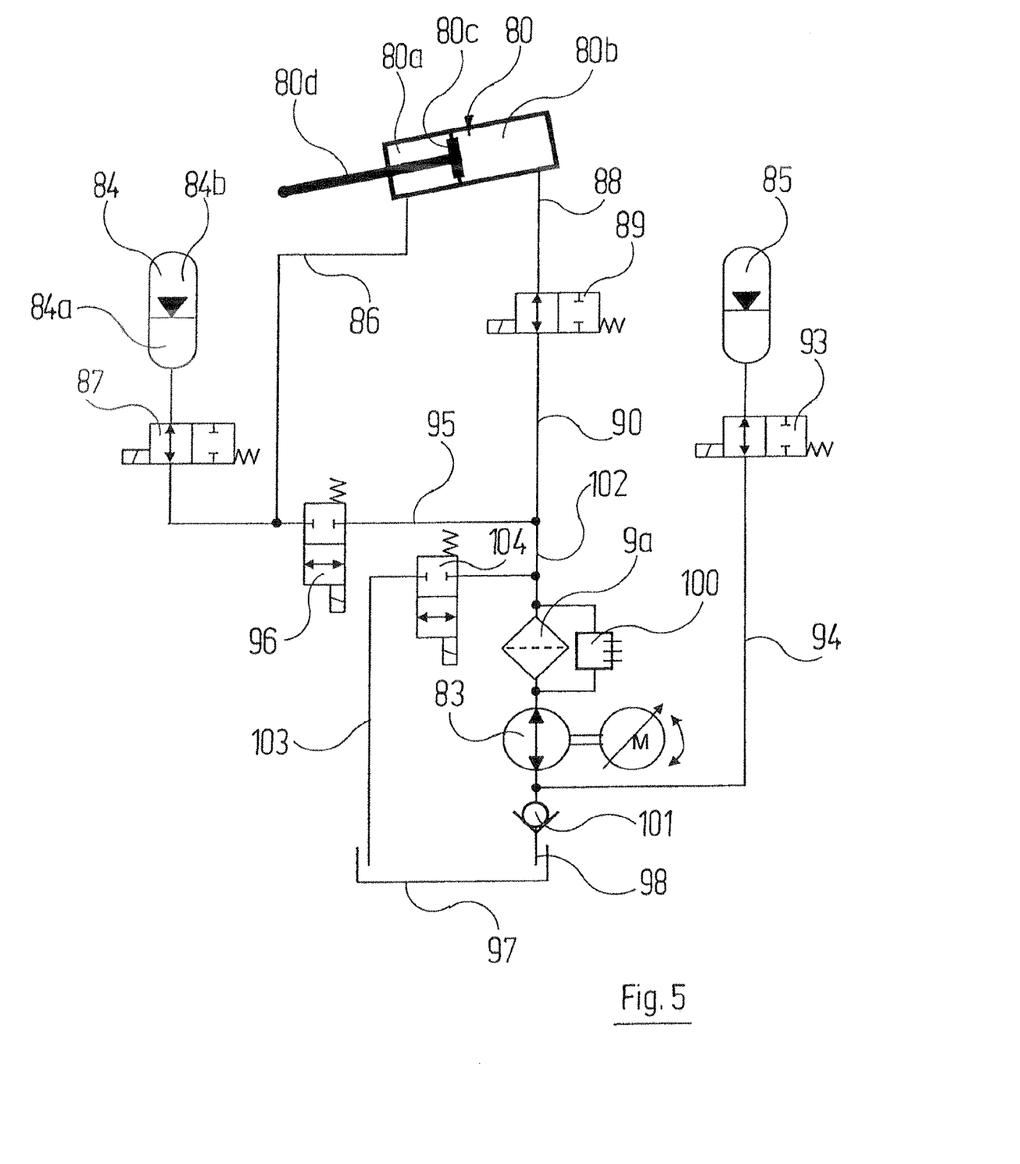
FIG. 5 an alternative hydraulic diagram for the transport carriage of FIG. 1.

FIG. 5 shows an alternative hydraulic system which is particularly suitable for use with pure water as the hydraulic fluid. The reason for a different design of the hydraulic system being selected here is that effective proportional valves are not available for water.

The hydraulic diagram of FIG. 5 does not differ widely from that shown in FIG. 4. Therefore, components in FIG. 5 which correspond to those in FIG. 4 are denoted by the same reference numerals. The description below restricts itself to the differences.

Since, as mentioned, it is not possible to use proportional valves when using water as the hydraulic fluid, the hydraulic diagram in FIG. 5 no longer contains a proportional valve. Instead, a frequency-controlled two quadrant pump 83 is used, in which the pump capacity can be controlled by the motor speed. The second pressure accumulator 85 is connected to the suction side of the hydraulic pump 83 by way of the 2/2-way valve associated with it, and more precisely downstream of the non-return valve 101 which is in turn in communication with the fluid tank 97 by way of the line 98.

The mode of operation of the hydraulic diagram according to FIG. 5 corresponds substantially to that of the hydraulic diagram of FIG. 4. There are no differences in the lifting of the swivel arms 50, 51, where the first pressure accumulator 84 is connected to the working chamber 80a of the piston-cylinder unit 80 by way of the 2/2-way valve 97 when the 2/2-way valve 96 is closed and the piston 80c is pressed to the right in FIG. 5.

It is again possible to fill the pressure accumulator 85 during stoppages of the transport carriage 5 with the aid of the hydraulic pump 83 when the 2/2-way valves 89 and 104 are closed and the 2/2-way valve 93 is open, thus enabling the required capacity of the hydraulic pump 83 to be reduced. The delivery direction of the hydraulic pump 83 is reversed here by reversing the direction of rotation.

To lower the swivel arms 50, 51, the 2/2-way valves 93 and 89 are opened whilst the 2/2-way valve 104 remains closed. The suction side of the hydraulic pump 83 is already at the pressure here which prevailed previously in the pressure accumulator 85, so that the hydraulic pump 83 only has to increase the pressure difference slightly in order to overcome the pressure prevailing in the working chamber 80a of the piston-cylinder unit 80 and push the piston 80c to the left in FIG. 5 to lower the vehicle body. The speed of this lowering movement is determined by the speed of the hydraulic pump 83.

The speed of the downward movement of the vehicle body during the movement of the piston 80c to the right in FIG. 5 is determined by a fixed throttling, for example predetermined by the 2/2-way valves 89, 104 in their open position.

The exemplary embodiment of FIG. 5 also enables the hydraulic fluid, i.e. the water in this case, to circulate via the filter 99 and the open 2/2-way valve 104 with the aid of the hydraulic pump 83 and thereby be cleaned.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A system for the treatment of objects comprising:
   at least one treatment container, in which a treatment medium is applied to at least one the object;
   at least one transport carriage, which guides the at least one object in a translatory movement through the system, thereby introducing the at least one object into the at least one treatment container, and removing the at least one object from the at least one treatment container, and, wherein the at least one transport carriage comprises:
     a moveable chassis;
     at least one swivel arm connected to the movable chassis in an articulated manner;
     a holding means for the at least one object, which is fixed to the at least one swivel arm;
     wheels for allowing translatory movement of the movable chassis;
     a drive device for the swivel movement of the at least one swivel arm;
     a weight balancing device by means of which a force required to swivel the at least one swivel arm is reduced and which comprises an energy accumulator in which energy associated with lowering of the at least one object is buffered and from which the energy is retrieved during an upward movement of the at least one object,
   wherein
     the drive device for the at least one swivel arm and the weight balancing device are formed together by at least one hydraulically operating piston-cylinder unit which has:
     a first working chamber which diminishes during a downward movement of the at least one swivel arm and is connected in a closed system to a first pressure accumulator, and a second working chamber which increases during the downward movement of the at least one swivel arm and is connected to a source of pressurised hydraulic fluid which is emptied into a fluid tank during the upward movement of the at least one swivel arm, wherein the first pressure accumulator and the source of pressurised hydraulic fluid are distinct systems;
   and wherein when a connection between the first working chamber and the first pressure accumulator is open, a pressure of the pressurised hydraulic fluid in the first pressure accumulator is sufficient to swivel the at least one swivel upwards when a pressure in the second working chamber of the piston-cylinder unit has dropped below a particular value.

2. A system according to claim 1, wherein the source for pressurised hydraulic fluid comprises a hydraulic pump and a second pressure accumulator.

3. A system according to claim 1, wherein each pressure accumulator contains a diaphragm which divides an interior of each pressure accumulator into a first pressure accumulator working chamber filled with hydraulic fluid and a second pressure accumulator working chamber filled with gas.

4. A system according to claim 1, wherein located in a flow path between the second working chamber of the piston-cylinder unit and the source for pressurized hydraulic fluid or in a flow path between the first working chamber of the piston-cylinder unit and the first pressure accumulator, there is a proportional valve by way of which a speed of the swivel movement of the at least one swivel arm is adjusted.

5. A system according to claim 1, wherein the hydraulic fluid is a water/glycol mixture with a water content of more than 35 percent by weight.

6. A system according to claim 2, wherein the hydraulic pump is a frequency-controlled two quadrant pump.

7. A system according to claim 6, wherein the hydraulic fluid is pure water.

8. A system according to claim 1, wherein the first pressure accumulator is connected to the source of hydraulic pressure.

9. A system according to claim 2, wherein the second pressure accumulator is be connected to the hydraulic pump during idle times of the piston-cylinder unit.

10. A system according to claim 1 wherein when a connection between the second working chamber and a second pressure accumulator is open pressurized hydraulic fluid is introduced into the second working chamber, and when the pressure in the second working chamber exceeds a pressure of the first working chamber, the at least one swivel arm is moved downwards.

* * * * *